Figure 2:
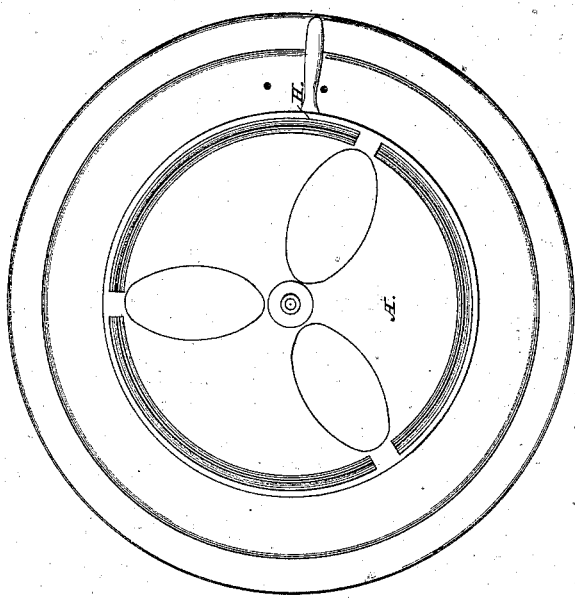
Figure 1:
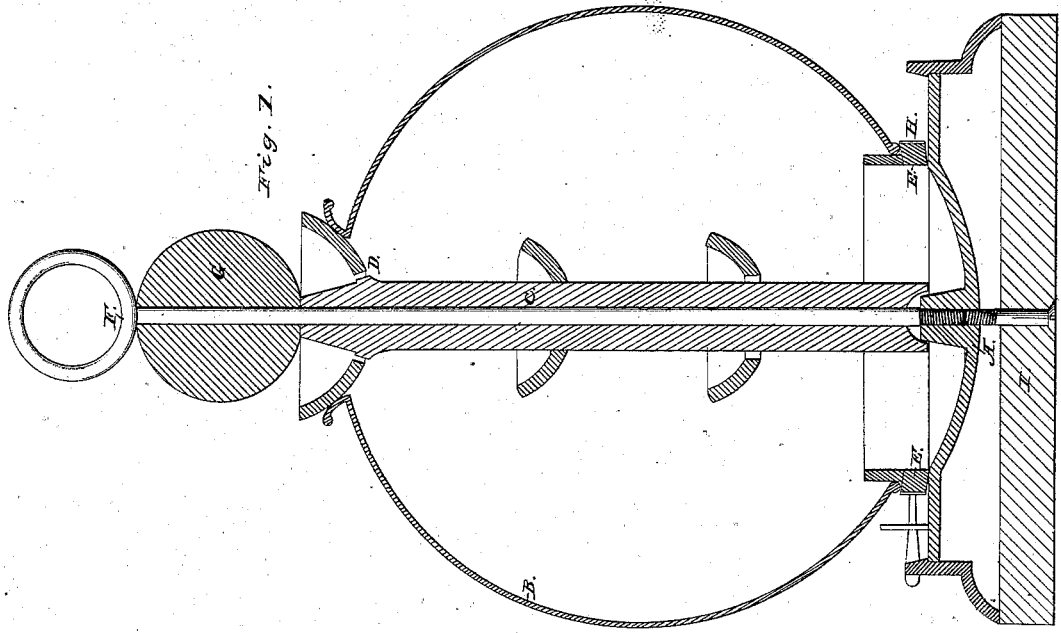

Snow & Smart,
Fly Trap,
Nº 8,252. Patented July 29, 1851.

UNITED STATES PATENT OFFICE.

HARVEY SNOW, OF LOWELL, MASSACHUSETTS, AND L. T. SMART, OF CAMPTON, NEW HAMPSHIRE.

FLY-TRAP.

Specification of Letters Patent No. 8,252, dated July 29, 1851.

*To all whom it may concern:*

Be it known that we, HARVEY SNOW, of Lowell, county of Middlesex, and State of Massachusetts, and LUTHER T. SMART, of Campton, Grafton county, and State of New Hampshire, have invented an Improved Fixture for Destroying Flies.

The nature of the fixture consists in using a glass B, made in the form of a globe or of any other form most useful or ornamental and connected as shown by our drawings. A makes the bottom for the glass to rest upon, and may be made of any kind of material found most convenient. It is intended in the concave inside of the glass to hold sweetening for to attract the flies through the openings E and to receive a supply of sweetning, or any kind of preparation found to be most useful, through the bowl of the tube C, by its issuing through the holes D, and running down the tube aforesaid; which tube may be made of any kind of wood, earthern or metal, found most convenient. G is a round ball bearing upon the tube C, which holds the glass and tube, and bottom together by means of the wire rod F which is screwed into the bottom A, as shown on the drawing. The top of the wire F being turned in form of a ring for the double purpose of carrying or hanging it up and unscrewing so as to separate the parts for cleaning and getting out the flies. The bottom may be made with apertures so as to stand the fixture upon a dish or plate to hold the flies, making it unnecessary to take it apart often, or if hung up a dish may be secured to the bottom to hold the flies, which may be killed by mixing poison with the bait, or if allowed to stand in the sun, they will accumulate and die of themselves, till the dead block up the entrance E. Fixtures may be made of different sizes so as to accommodate different locations.

We contemplate making some as large as a bushel measure, to stand in meat shops, and cook rooms, while some may be made very small, for less exposed situations. Also we contemplate making them with various ornamental parts, not inappropriate for a parlor, or sitting room.

The ring H may be used for the purpose of closing the apertures E when necessary. When no other convenient method of killing the flies, the whole fixture may be immersed in water.

I is a dish for holding the flies.

What we claim as our invention, and desire to secure by Letters Patent, is—

1. The tube C, in combination with the glass B, and the bottom A and rod F for the purpose above described, meaning to vary the construction while keeping the fixture substantially the same.

2. We also claim the ring H which is to close the apertures in the bottom at E for the purpose which it is applied, or anything similar in its application.

HARVEY SNOW.
LUTHER T. SMART.

Attest:
J. C. ALGER,
L. J. FLETCHER.